United States Patent

Ohsawa et al.

[11] Patent Number: 5,898,461
[45] Date of Patent: Apr. 27, 1999

[54] IMAGE PROCESSING APPARATUS

[75] Inventors: Hidefumi Ohsawa, Kawaguchi; Kunihiro Yamamoto, Tokyo, both of Japan

[73] Assignee: Canon Kabushiki Kaisha, Tokyo, Japan

[21] Appl. No.: 08/960,117

[22] Filed: Oct. 27, 1997

Related U.S. Application Data

[63] Continuation of application No. 08/262,513, Jun. 20, 1994, abandoned.

[30] Foreign Application Priority Data

Jun. 22, 1993 [JP] Japan ................................. 5-150645
Jul. 29, 1993 [JP] Japan ................................. 5-188297
Dec. 27, 1993 [JP] Japan ................................. 5-330225

[51] Int. Cl.⁶ ................................................. H04N 7/36
[52] U.S. Cl. ........................................... 348/415; 348/439
[58] Field of Search ................................. 348/384, 390, 348/403, 409, 415, 423, 439, 405; 358/335, 320, 337, 339; 364/514 R; 360/51, 53, 11.1

[56] References Cited

U.S. PATENT DOCUMENTS

| 4,931,879 | 6/1990 | Koga et al. | 358/335 |
| 5,032,927 | 7/1991 | Watanabe et al. | 358/335 |
| 5,126,852 | 6/1992 | Nishino et al. | 358/335 |
| 5,311,309 | 5/1994 | Ersoz et al. | 348/409 |
| 5,420,801 | 5/1995 | Dockter et al. | 364/514 R |
| 5,467,413 | 11/1995 | Barrett | 348/405 |

FOREIGN PATENT DOCUMENTS 54-088716  7/1979  Japan .
1041380    5/1989  Japan .

*Primary Examiner*—Howard Britton
*Attorney, Agent, or Firm*—Fitzpatric, Cella Harper & Scinto

[57] ABSTRACT

An image processing apparatus having an input means which inputs coded image data for a plurality of frames, with the coded image data being coded by intraframe and interframe coding. A decoder decodes the coded image, and skips decoding of the decoded image data in units of frames when the decoding is not performed at a predetermined timing, and performs decoding of intraframe coded image data following a skipped frame.

7 Claims, 9 Drawing Sheets

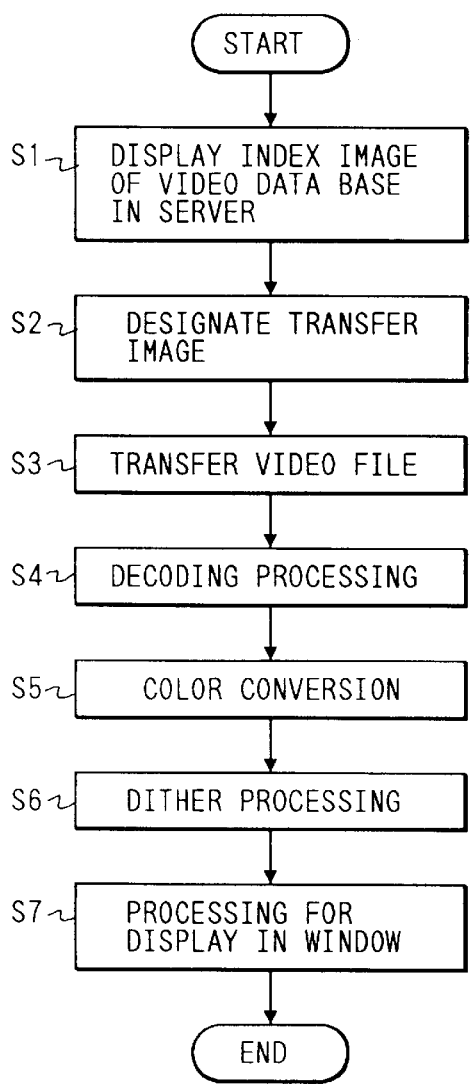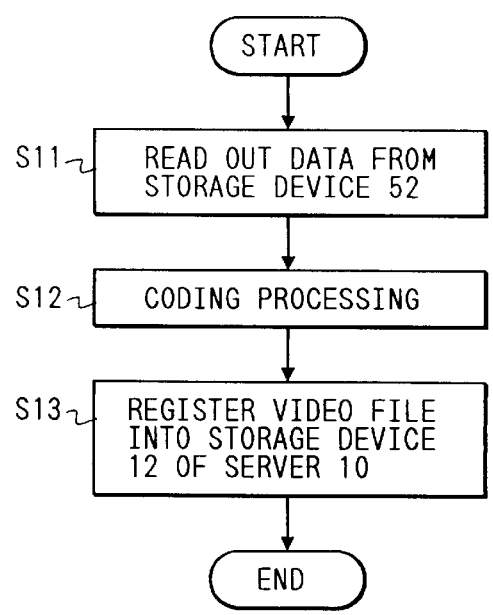

FIG. 6

| TABLE NUMBER | R VALUE | G VALUE | B VALUE | |
|---|---|---|---|---|
| 0<br>1<br>2<br>⋮<br>127 | 0<br>2<br>4<br>⋮<br>225 | 0<br>2<br>4<br>⋮<br>255 | 0<br>2<br>4<br>⋮<br>255 | LOOKUP TABLE FOR BLACK AND WHITE |
| 128<br>129<br>130<br>131<br>⋮<br>190<br>191 | 0<br>85<br>175<br>255<br>0<br>⋮<br>170<br>255 | 0<br>0<br>0<br>0<br>85<br>⋮<br>255<br>255 | 0<br>0<br>0<br>0<br>0<br>⋮<br>255<br>255 | LOOKUP TABLE FOR COLOR DITHER |
| 192<br>⋮<br>255 | | | | UNUSED OR USED IN OTHER APPRICATION |

IMAGE PROCESSING APPARATUS

This application is a continuation of application Ser. No. 08/262,513, filed Jun. 20, 1994, now abandoned.

BACKGROUND OF THE INVENTION

1. Field of the Invention

The present invention relates to an image processing apparatus and, more particularly, to an image processing apparatus which processes coded data.

2. Related Background Art

In a system for synchronously reproducing a video image and an audio signal as an example of such an image processing apparatus, there are systems such as a TV conference system, a television telephone system, or the like which require a real-time performance and a system in which a real-time performance is relatively weak and which handles a video/audio information file (hereinafter, simply abbreviated as a video file) preserved or stored in a recording medium of a large capacity. According to the former system, since the coding on the transmission side of the video and audio signals and the decoding on the reception side must be performed in a real-time manner, an exclusive-use hardware is needed. The latter system relates to, for example, the case of constructing a video data base comprising a number of video files. More importance is paid to picture quality, a transmitting time (or transmission costs), or the like than is paid to the real-time performance of the video image.

There are the following limitations in a video/audio transmitting system which is constructed by using a general work station. That is, in general, a frame memory of the display system is constructed by eight bits and uses 256 colors among 6.40 million colors. The color to be displayed can be selected by a lookup table method. On the other hand, in the case where a black and white image and a color image mixedly exist and are displayed by a color monitor of eight bits, the black and white image can be expressed by 128 gradations (gray scale) and a color image can be expressed by 64 colors by allocating two bits to each of the colors of R, G, and B by a dither processing.

In communicating and accumulating systems, both of the audio data and the video data are compressed and coded, thereby reducing a data amount. As a compressing method, there are three types of methods: an interframe coding (INTER) method; an intraframe coding (INTRA) method; and a method using both of the INTER method and the INTRA method. According to the compressing method using both of the interframe coding method and the intraframe coding method, generally, in order to prevent the propagation of a transmission error and to make a special reproduction easy, the intraframe coded frames are arranged adaptively or uniformly at proper intervals. As an individual coding method, a discrete cosine transformation (DCT), a differential pulse code modulation (DPCM), or the like is used.

Although it is sufficient to use the interframe coding many times in order to raise a compression ratio, there is a drawback such that the data of the previous frame is necessary for decoding.

In a moving image, it is necessary to synchronize the reproduction of the video image and the reproduction of the audio signal. However, in the case where a processing ability of the hardware or a processing ability in reproducing processing is low, it is necessary to skip proper frames. In the conventional apparatus, even when performing such a frame skip, the interframe coded frame is once decoded and the system is set into a state in which the system is prepared for the decoding of the next frame and, after that, the frame skip is executed, so that it takes a long time for decoding. Consequently, the number of frames which must be skipped increases and a reproduction image becomes unnatural.

In the above-mentioned image communication system, however, when a CPU executes processing to reproduce and display a moving image, (1) in the case where another process is being performed by a multitask function, or (2) in the case where the ability of the CPU is inferior to the performance that is expected on the transmission side, or the like, there is a drawback such that it is impossible to synchronously reproduce all of the frames while all of the frames are displayed.

That is, many general computers have a multi task function such that a plurality of processes can be simultaneously executed by the general computer. Since computer resources such as memory capacity which can be used in the processing to reproduce a moving image, processing ability of the CPU, and the like change momentarily, according to a conventional algorithm for the synchronous reproduction using the processing by the exclusive-use hardware as a prerequisite, there are problems such that a proper synchronization cannot be performed and the synchronous reproduction can be made impossible.

On the other hand, there is a TV telephone in an image communicating system having a low bit rate. In the TV telephone system, the transmission and reception of data in a real-time manner are fundamental and a hardware such as exclusive-use terminal, exclusive-use expansion board, and the like are necessary. On the other hand, a system in which a video file is exchanged on a computer such as a general work station or the like is also known. According to such a method using the video file, in association with the improvement of a processing speed of the CPU, the processings such as communication, play display, or the like of an image can be processed by software. However, there is also a problem such that synchronous reproduction is also made impossible in a manner similar to the foregoing case.

SUMMARY OF THE INVENTION

It is an object of the present invention to provide an image processing apparatus and method which can solve all of the foregoing problems or can individually solve them.

Another object of the invention is to provide an image processing apparatus in which a change in a reproduction image is made more smooth.

Still another object of the invention is to provide an image processing apparatus which can preferably expand the coded image data by software.

Under such objects, according to a preferred embodiment of the invention, there is provided a video reproducing apparatus for reproducing, at a specified period, compressed video information in which picture planes at a predetermined period have been compression coded and a header including information indicative of a compression data amount has been added to each picture plane, wherein when a timing for an expanding processing to the compressed video information is out of time for reproduction and display, the picture plane which was intra picture plane compression coded and which is located at a later position with respect to time is searched with reference to the header, and the picture planes existing between the present picture plane and the searched picture plane are skipped.

Further another object of the invention is to provide an image processing apparatus and method having a novel function.

The above and other objects and features of the present invention will become apparent from the following detailed description and the appended claims with reference to the accompanying drawings.

BRIEF DESCRIPTION OF THE DRAWINGS

FIG. 3 is an operation flowchart of FIG. 1;

FIG. 5 is a flowchart for forming a video file from the video data;

FIG. 6 is a lookup table for an image in which a black and white image and a color image mixedly exist;

DETAILED DESCRIPTION OF THE PREFERRED EMBODIMENTS

An embodiment of the present invention will be described hereinbelow with reference to the drawings.

Figure 1:
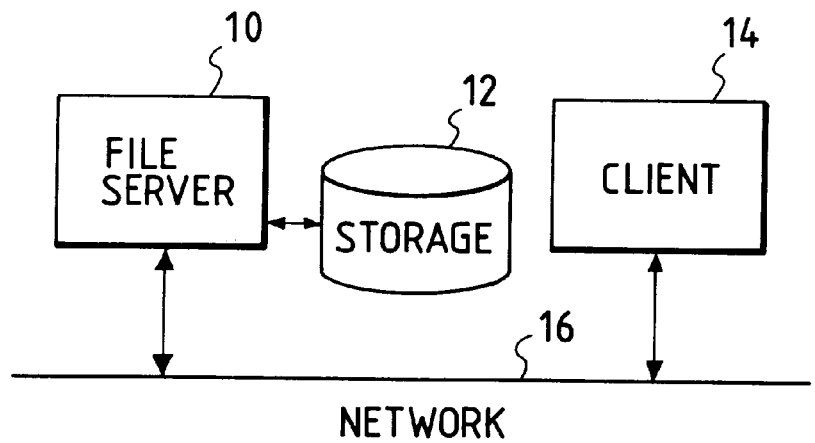
FIG. 1 is a schematic constructional block diagram of a video/audio transmission system as a prerequisite of the invention.

A video/audio processing system as a prerequisite of the invention will be first described. FIG. 1 is a a schematic constructional block diagram. In FIG. 1, reference numeral 10 denotes a file server and a video data base has been accumulated and preserved in a storage unit 12 having a large storage capacity. Reference numeral 14 denotes a work station or small computer serving as a client which is connected to the file server 10 through a network 16. In the embodiment, a well-known X window in a work station is used as a monitor display system of the client 14.

Figure 2:
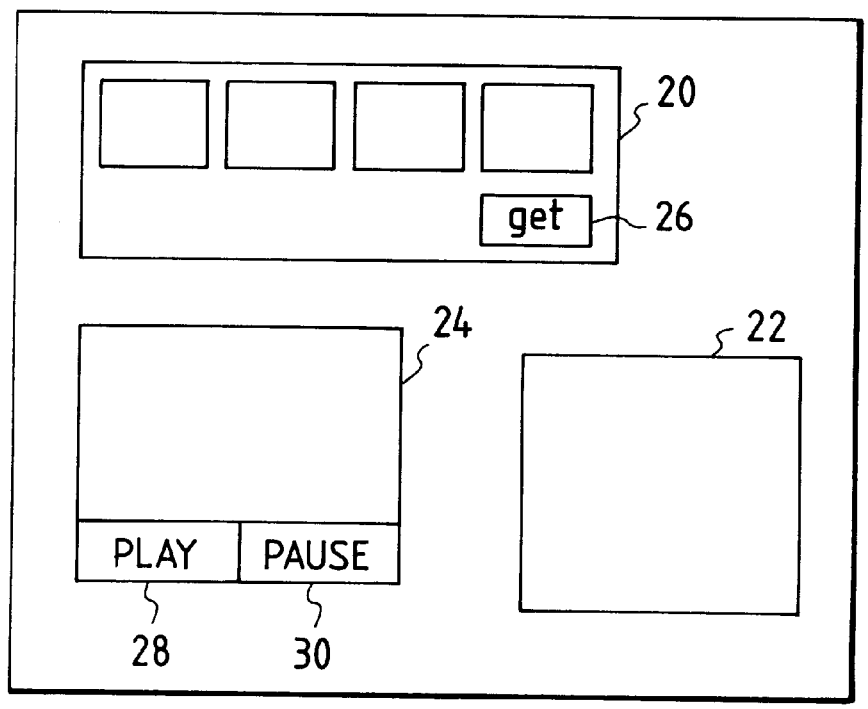
FIG. 2 is an explanatory diagram of an operation display screen of a client 14 shown in FIG. 1.

FIG. 2 shows a monitor screen of the client 14. The monitor screen of the client 14 has therein: an index window 20 to display an index image of the video data base which is stored in the storage 12 of the server 10; a file box window 22 to display a list of video file names which have already been transferred from the video data base to the client 14; and a play display window 24 to display a video image of the video file designated from the video file that is displayed in the file box window 22.

A get button 26 to instruct the transfer of the designated video file to the self apparatus is provided in the index window 20. A play button 28 to instruct the start of the reproduction and a pause button 30 to instruct the interruption of the reproduction are provided in the play display window 24 and are shown in the diagram. However, a play stop button, frame feed button to forwardly and reversely feed frames, and the like can be also provided in addition to the buttons 28 and 30.

FIG. 3 shows an operation flowchart of the system shown in FIGS. 1 and 2. The index image of the video data base provided for the server 10 is displayed in the index window 20 (step S1). In the embodiment, such an index image has also been stored in the server 10 and the client 14 reads out the index image from the server 10 through the network 16. For example, the index image is the still image of the first or representative picture plane of the video file. A video file to be reproduced is selected from the index image displayed (S2). Such a selection can be also performed by, for instance, using a cursor displayed on the monitor screen. The client 14 generates a command to the server 10 in a manner such that when the get button 26 is pressed, the selected video file is transferred from the server 10 to the client 14 through the network 16. Thus, the selected video file is transferred (S3). The client 14 preserves the received video file into a storage (not shown). The names of the video files transferred to the client 14 are displayed as a list in the file box window 22.

When one of the video file names displayed as a list in the file box window 22 is designated, the first image is displayed as a video image in the play display window 24. When the play button 28 is operated, the client 14 decodes the compressed code of the designated video file (S4). The color conversion is performed from the YUV system to the RGB system (S5). The converted image data is dither processed (S6) and the resultant video image is displayed in the play display window 24 and the reproduction audio signal is generated as sound (S7).

Figure 4:
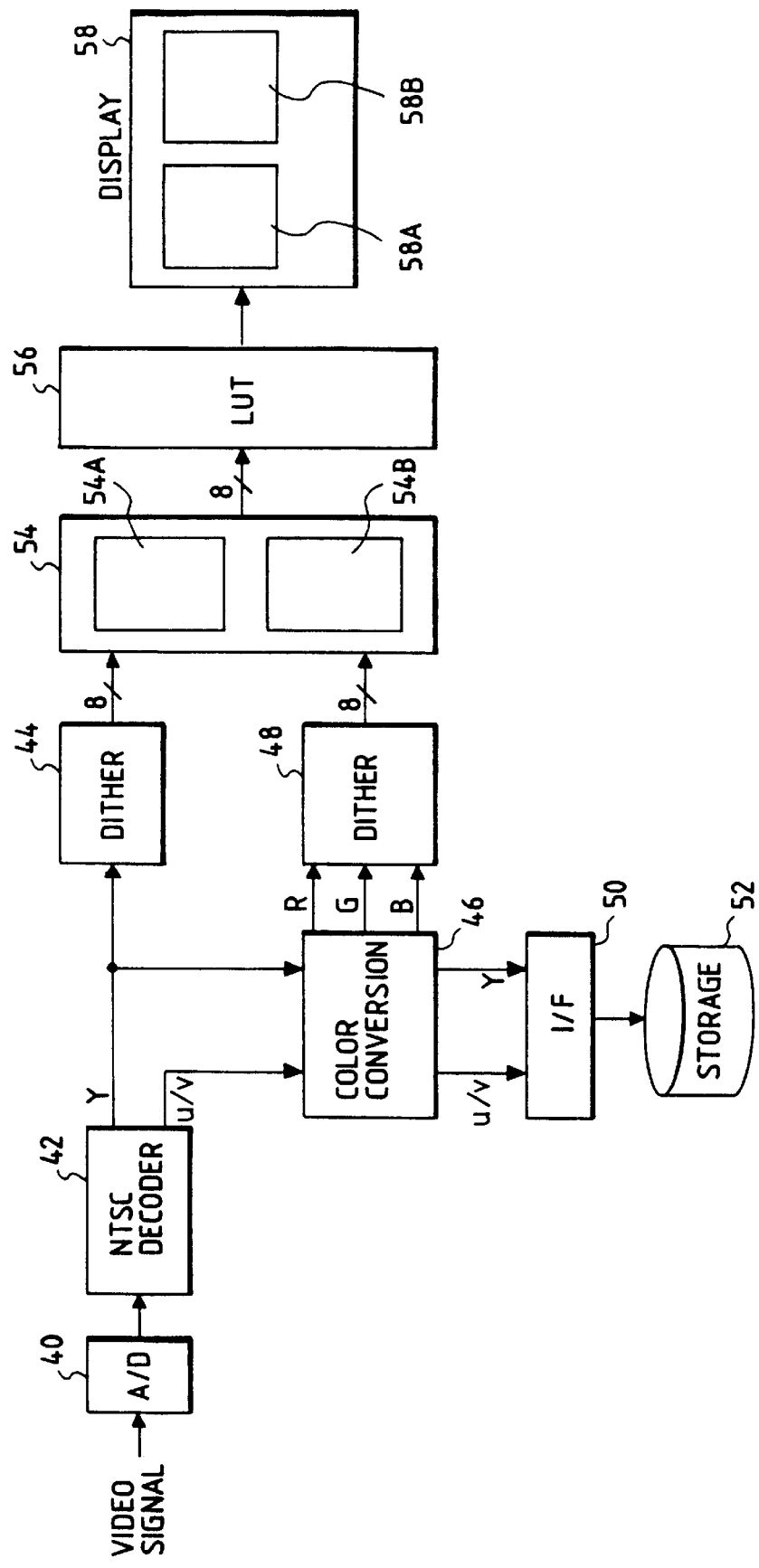
FIG. 4 is a schematic constructional block diagram of an apparatus for forming data from video information.

FIG. 4 is a schematic constructional block diagram of a circuit to form data from the analog input video image to be formed as a video file. The video signal from a video camera or a video tape recorder is converted into the digital signal by an A/D converter 40. The digital signal is converted into a luminance signal Y and a color difference signal U/V by an NTSC decoder 42.

A dither circuit 44 converts the luminance signal Y from the NTSC decoder 42 into the lookup table number of eight bits. A color conversion circuit 46 converts the luminance signal Y and color difference signal U/V from the NTSC decoder 42 into the RGB signals. A dither circuit 48 converts a RGB signals into the lookup table number of eight bits. The color conversion circuit 46 directly supplies the luminance signal Y and color difference signal U/V from the NTSC decoder 42 to a storage unit 52 having a large storage capacity through an interface 50. A digital audio signal from an audio processing system (not shown) is also supplied to the storage unit 52 and is stored in the storage unit 52 together with the video signal.

An output of the dither circuit 44 is stored in a memory area 54A corresponding to the picture plane to store a white and black gradation image in a frame memory 54. An output of the dither circuit 48 is stored in a memory area 54B corresponding to the screen to display a color image. 8-bit data which is stored in the frame memory 54 is sequentially read out and supplied to a video display 58 through a lookup table 56. The white and black gradation image in the memory area 54A is displayed in a window 58A in the display screen of the video display 58. The color image in the memory area 54B is displayed in a window 58B.

FIG. 5 is a flowchart for processes to store the video and audio original data to be stored in the storage unit 52 and in the storage unit 12 of the server 10 as a video file. The video and audio original data is read out from the storage 52 (S11) and is compression coded (S12) and is stored in the storage unit 12 of the server 10 and is registered as a video file (S13).

FIG. 6 is a diagram showing an example of the LUT 56, namely, the lookup table of 256 colors which is used to mixedly display a gradation black and white image and a color image. The table numbers 0 to 127 are used for the black and white color and expressed by 128 gradations of seven bits. The table numbers 128 to 191 are used for the color image and express 64 colors of a color dither. The table numbers 192 to 255 are not used or are used for other applications.

Figure 7:
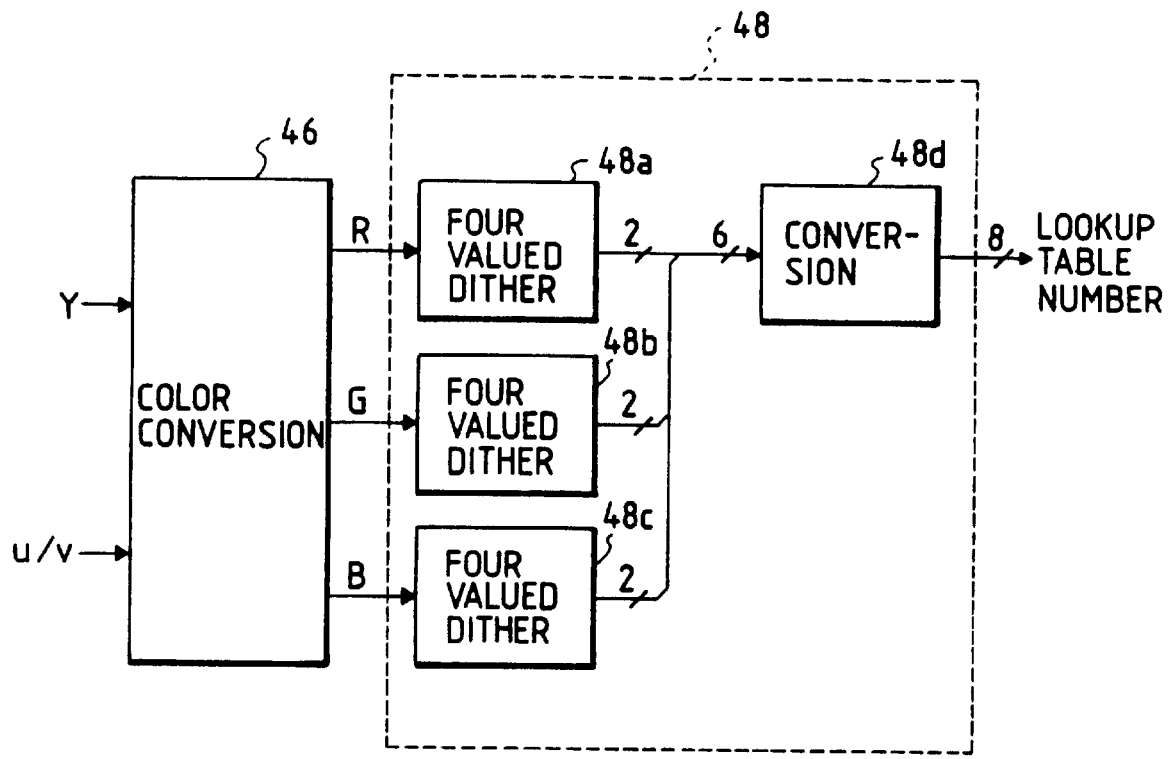
FIG. 7 is a detailed circuit block diagram of a dither circuit 48.

FIG. 7 shows a detailed circuit block diagram of the dither circuit 48. The color conversion circuit 46 converts the YUV system into the RGB system in accordance with the following equations. That is, $$R=Y+(V-128)/0.713$$

$$G=Y+(U-128)/0.564$$

$$B=(Y-0.299R-0.114B)/0.587$$

Four valued dither circuits 48a, 48b, and 48c convert R, G, and B data from the color conversion circuit 46 into the data of two bits. A conversion circuit 48d allocates the data of total six bits from the four valued dither circuits 48a, 48b, and 48c to the table numbers 128 to 191 shown in FIG. 7.

As a compressing method of the video signal, as already described above, there is known a compression coding method whereby the interframe coding (INTER) and the intraframe coding (INTRA) are arranged adaptively or in accordance with a predetermined order. When considering a frame skip, it is necessary to arrange the intraframe coding at certain intervals. An arrangement ratio of the intraframe coding and the interframe coding is determined by a compression ratio, a picture quality, a reproducing processing ability, and the like which are needed. In an embodiment of the invention, for easy understanding, a construction such that the intraframe coding and the interframe coding are arranged every frame is used. With this construction, the frame skip can be finely controlled.

The compression coding in the invention is not limited to the above method but, for instance, the intraframe coding and the interframe coding can also be arranged at arbitrary timings.

Figure 8:
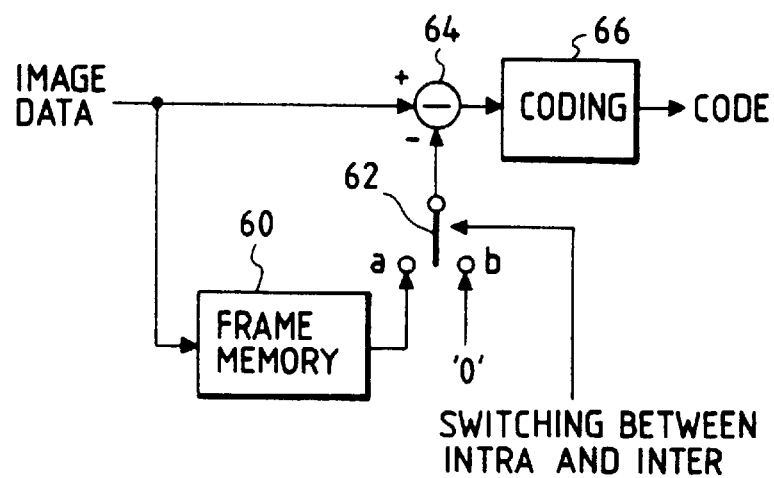
FIG. 8 is a schematic constructional block diagram for a compression coding apparatus of video information.

FIG. 8 shows a schematic constructional block diagram of a compression coding apparatus of the video signal in the embodiment. A frame memory 60 delays the input image data by a time corresponding to one frame and its output is supplied to an (a) contact of a switch 62. "0" is supplied to a (b) contact of the switch 62. A selection value of the switch 62 is supplied to a negative input terminal of a subtracter 64. The input image data is supplied to a positive input terminal of the subtracter 64.

The switch 62 is connected to the (a) contact in case of the interframe coding and is connected to the (b) contact in case of the intraframe coding by an INTRA/INTER change-over signal. Therefore, the subtracter 64 outputs the input image data as it is in case of the intraframe coding and outputs the differential value between the present frame and the previous frame in case of the interframe coding. A coding circuit 66 compression codes the output of the subtracter 64 and generates compressed coding data. In the embodiment, as a coding circuit 66, there is used a coding circuit 66 such that a data amount after completion of the coding changes in accordance with a state of the image data.

Figure 9:
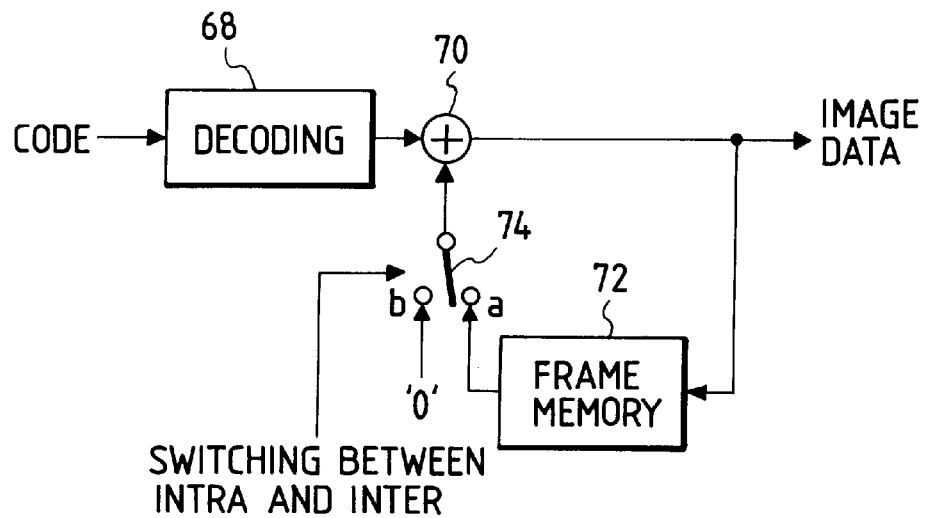
FIG. 9 is a schematic constructional block diagram of a decoding apparatus corresponding to FIG. 8.

FIG. 9 is a constructional block diagram of a decoding apparatus corresponding to the apparatus of FIG. 8. A decoding circuit 68 corresponds to the coding circuit 66 and decodes the compressed coding data. An output of the decoding circuit 68 is supplied to an adder 70. An output of the adder 70 is delayed by a time corresponding to one frame by a frame memory 72 and is supplied to an (a) contact of a switch 74. "0" is supplied to a (b) contact of the switch 74. A selected value of the switch 74 is supplied to the adder 70.

In a manner similar to the switch 62, the switch 74 is connected to the (a) contact in case of the interframe coding and is connected to the (b) contact in case of the intraframe coding by the INTRA/INTER change-over signal. The INTRA/INTER change-over signal is formed from intraframe coding/interframe coding ID information included in the header of the compressed image data.

By the switching of the switch 74, the adder 70 generates an output of the decoding circuit 68 as it is for the frame which was intraframe coded. For the frame which was interframe coded, the adder 70 adds the image data of the previous frame to the output of the decoding circuit 68 and generates the resultant data. An output of the adder 70 becomes the reconstructed image data.

Figure 10:
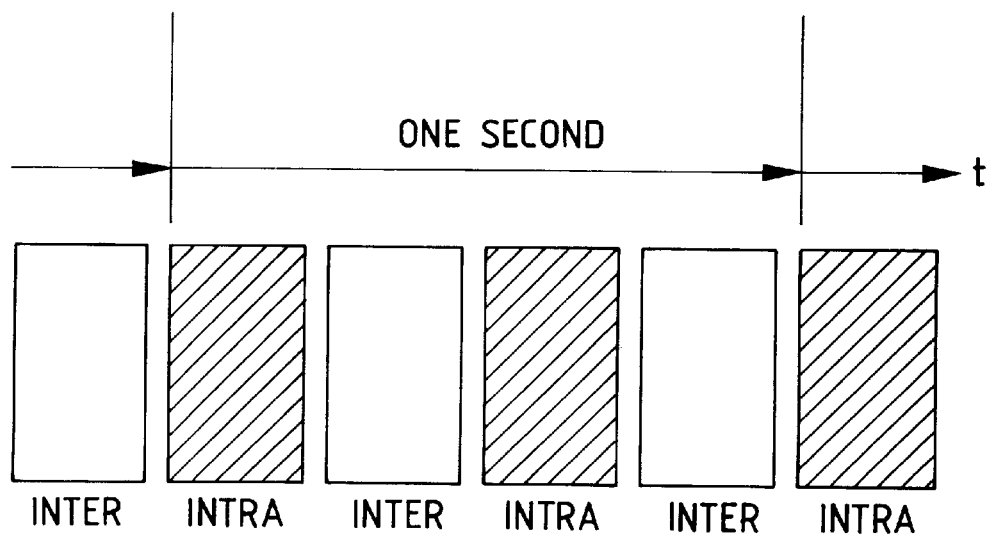
FIG. 10 is a sequence diagram of an example in which intraframe coding and interframe coding are alternately arranged.

FIG. 10 is an explanatory diagram of a sequence for switching the intraframe coding and the interframe coding every frame. In the embodiment, one second is constructed by four frames. The invention, however, is not limited to such a construction. In the case where the reproduction display processing is not in time and the frame skip is executed, the frame of the interframe coding is skipped and the data is reproduced and displayed from the frame of the intraframe coding.

Figure 11:
FIG. 11 is a recording format diagram of coded video information.
Figure 12:
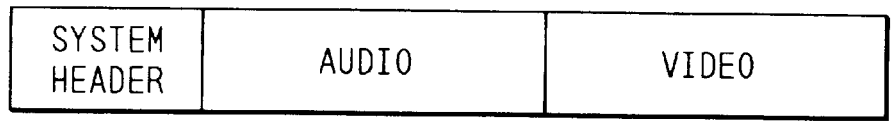
FIG. 12 is a constructional diagram of a video file according to an embodiment of the invention.

The coded video data is preserved by a format as shown in FIG. 11 and is transmitted. A header of a fixed length exists before the coding data. The compressing method, ID information indicative of the intraframe coding or the interframe coding, and information indicative of a code amount of the coded data are included in the header. By reading the header of each frame, it is possible to discriminate whether the frame is the interframe coded frame or the interframe coded frame.

As for the audio signal, a well-known general coding method can be used.

In the embodiment, when a desired video file is designated from the video data base accumulated in the storage 12 of the server 10, only the audio information included in the designated video file is first transferred to the client 14 and is reproduced, and generated as a sound. The user of the client 14 listens to the reproduced audio sound and judges whether the video image is necessary or unnecessary. If it is necessary, the transfer of the video information is requested. When the video information is transferred, the server 10 can also exclude the audio information which has already been transferred. However, when considering the synchronizing relation between the video image and the audio signal, it is preferable to transfer the entire video file including the audio information.

Figure 13:
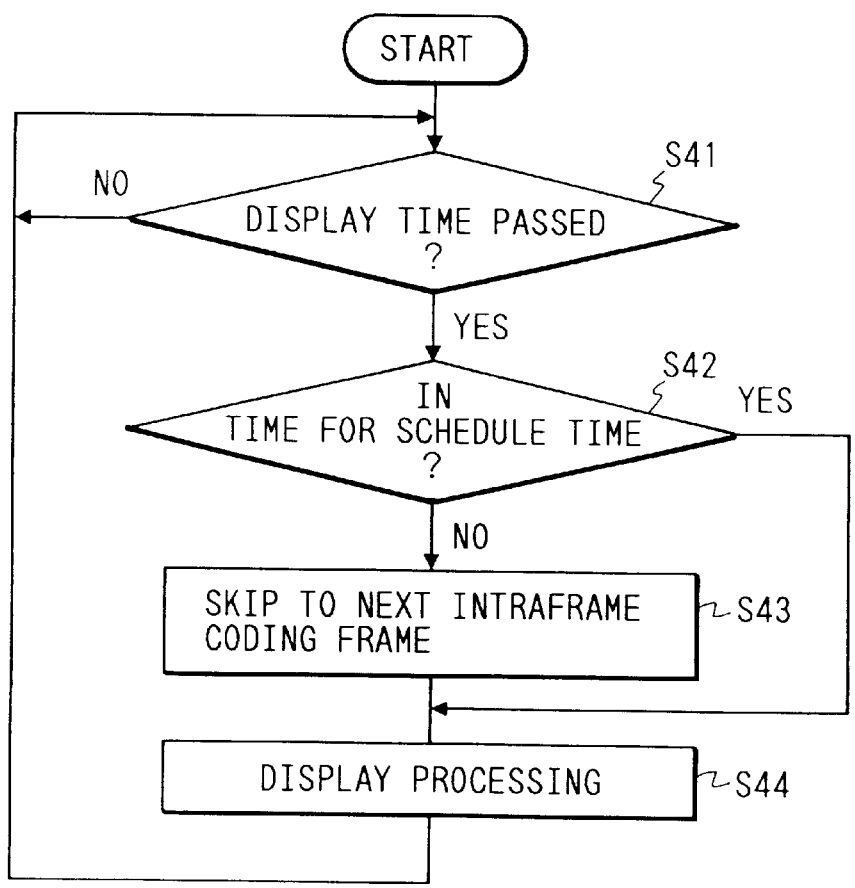
FIG. 13 is a flowchart for synchronously reproducing a video image.

FIG. 13 is a flowchart of reproducing and synchronizing the video image and the audio signal. In the embodiment, it is assumed that the image decoded by the decoding circuit 68 in FIG. 9 is frame displayed at an interval of T seconds.

The apparatus waits until the present time reaches the display schedule time of the (nth) frame, namely, the time of (n×T) (step S41). A check is made to see if the apparatus is in time for schedule time as for the arrival or elapse of the schedule time or not (S42). When the apparatus is in time for the schedule time, the frame is reproduced and displayed (S44). If NO, the intraframe coded frame that is preceding with respect to the time such that the apparatus will be in time is searched in consideration of the time which is required for the reproducing process (S43) and such a frame is reproduced and displayed (S44). The above processes are executed until the end of the video file.

It will be obviously understood that a part of or all of the above processes in the embodiment can be realized by any one of hardware or software.

When the invention is embodied, particularly, in addition to the case of constructing the decoding circuit 68 shown in FIG. 9 by hardware, a large effect is obtained when the decoding is executed by the CPU in accordance with software including a decoding program.

As will be easily understood from the above description, according to the embodiment, the compressed video information can be reproduced and output at a predetermined time period irrespective of the level of the reproducing processing ability. The reproducing processing ability can be effectively used. The number of picture planes to be skipped can be reduced, and the image can be made to more smoothly change.

The second embodiment of the invention will now be described.

In the second embodiment, since substantially the same hardware as that described in FIGS. 1, 4, 7 to 9 can be used, its description is omitted here.

Figure 14:
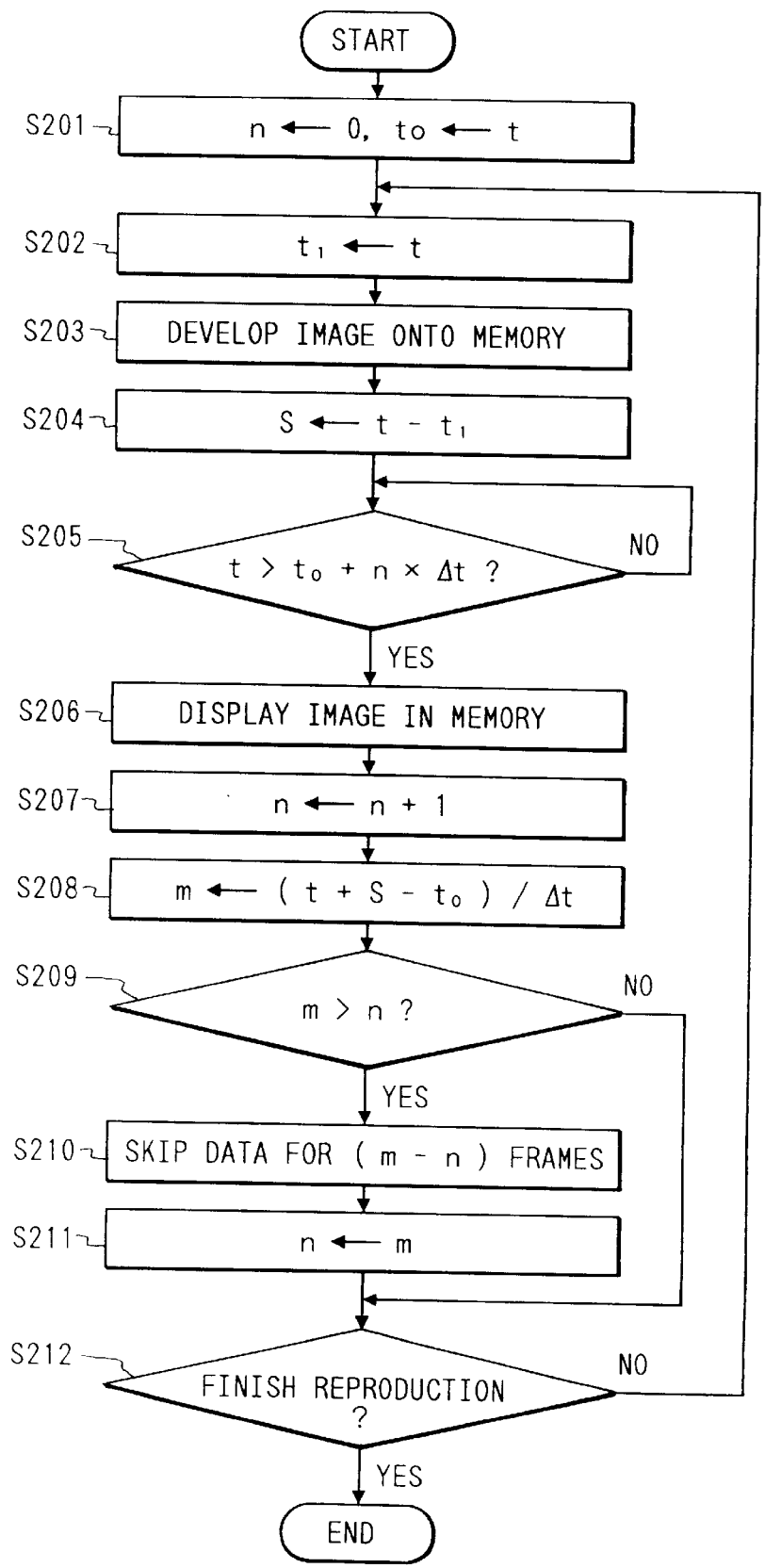
FIG. 14 is a flowchart showing a modification of FIG. 13.

FIG. 14 is a flowchart showing a synchronization control in the second embodiment. A case of frame displaying at an interval of $\Delta t$ from time $t_0$ will now be described as an example. In the diagram, t denotes the present time which is obtained by referring to an internal timer of the apparatus.

In step S201, the present time t is substituted for the variable $t_0$. The variable n is initialized to "0". In step S202, the present time t is substituted for a variable $t_1$.

In step S203, the compressed data is read out from the file and the processes such as expansion, color conversion, dither process, and the like which have already been described are executed and the processed data is developed in the memory into the image data of a format which can be displayed.

In step S204, the value which is obtained by subtracting $t_1$ from the present time t is substituted for a variable S. S indicates the time required for execution of the process in step S202.

Figure 16:
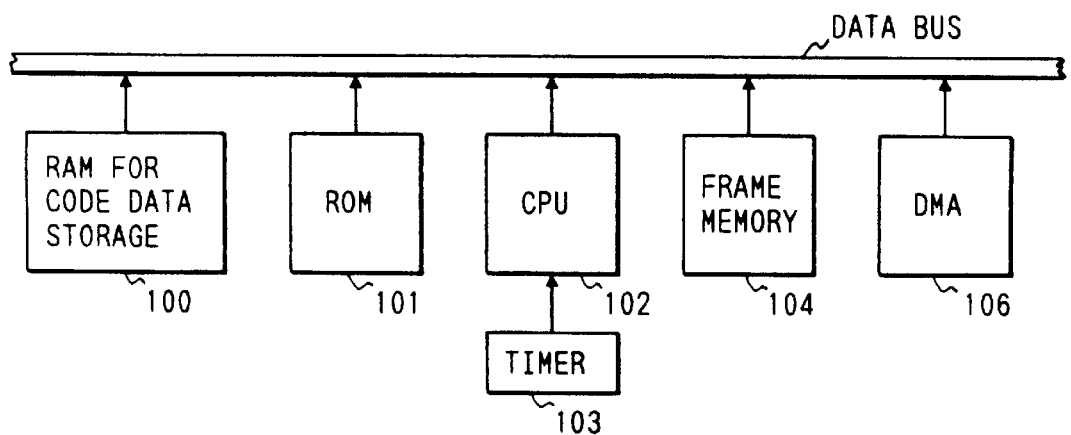
FIG. 16 is a diagram showing another constructional example of FIG. 9.

A check is made in step S205 to see if the present time has passed the display schedule time of the (nth) frame or not. (In the embodiment, now assuming that four frames are reproduced for one second as shown in FIG. 16, for example, the display schedule time is updated on a ¼ second unit basis.) If the present time has passed, the processing routine advances to the next step S206. If NO, step S205 is again executed. By the above processing loop,sy deviation of the synchronization due to the excessive progress of the display is prevented.

In step S206, the image data in the frame memory 54 shown in FIG. 4 is displayed.

In step S207, the frame number (n) is increased by "1".

In step S208, the number of the frame to be displayed next is calculated (the figures below the decimal point are counted as whole numbers) in consideration of the time (S) which is required for execution in step S206 and such a frame number is substituted for a variable m.

In step S209, the values of m and n are compared. If m is equal to or smaller than n, step S212 follows. If m is larger than n, step S210 follows.

In step S210, the data for (m−n) frames is skipped. Specifically speaking, a code data amount of the next frame is read out from the position of a seek pointer to the data file at that time point is read out and the seek pointer is progressed by a distance of only the code data amount, so that the data for one frame can be skipped. The above processes are repeated (m−n) times.

In step S211, m is substituted for the frame number n. That is, a deviation between the frame number by the data skip and the seek pointer to the file is corrected.

By the above processes in steps S208 to S211, a deviation of the synchronization in the case where the image data to be displayed is not obtained in the foregoing schedule display time by the process such as decoding in step S203 or the like, namely, in the case where the display is not in time is prevented.

In step S212, a check is made to see if the reproduction of a moving image is finished or not. As a reference of the judgment, there can be mentioned a case where the seek pointer to the file reaches the final end, namely, a case where the moving images are reproduced up to the last image, a case where the operator intends to interrupt the reproduction by pressing a stop button, a pause button, or the like, etc. In case of finishing, the processing routine advances to "END" and the subroutine is finished. If NO, the processing routine is returned to step S202 and the processes as described above are repeated.

According to the embodiment as described above, in the case where the moving image reproducing display processing is not in time for synchronization reproduction, the frame display is thinned out and in the case where the processing to reproduce and display the moving image is faster than the sync reproduction, the frame display is delayed. Therefore, by adaptively using both of them, even in the case where the computer resources for executing the moving image reproducing processing or the like fluctuates with respect to time, the synchronization adjustment can be properly performed.

In step S210, the code data amount of the next frame is read out from the position of the seek pointer of the data file. However, an example in which in order to read out such a code data amount, the data amount is previously added to the coding data of each frame of the data file at the time of coding or is added after completion of the coding will now be described with reference to FIG. 15.

Figure 15:
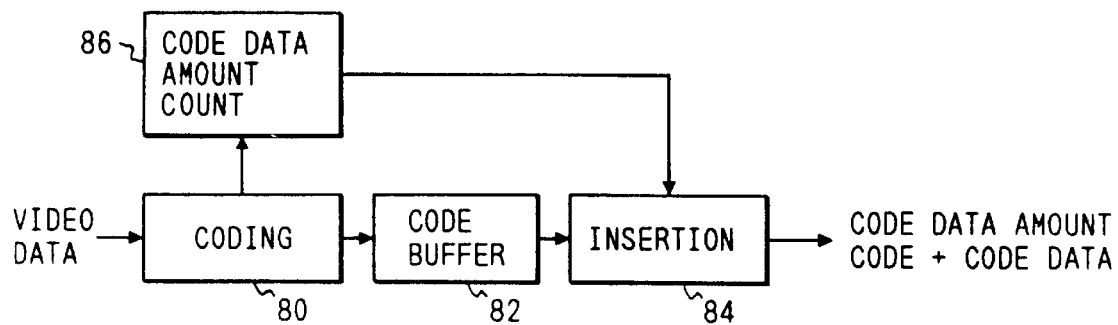
FIG. 15 is a diagram showing circuits which are connected to the coding apparatus in FIG. 8.

FIG. 15 is a schematic constructional block diagram of a circuit to insert a code indicative of the code data amount to the code data. The circuit in FIG. 15 is inserted in the post stage of the coding circuit 66 shown in FIG. 8. In FIG. 15, reference numeral 80 denotes a coding circuit; 82 a code buffer; 84 an insertion circuit to insert a code indicative of a code data amount into the code data; and 86 a counting circuit to count the code data amount generated.

The video data is coded by the coding circuit 80. After that, it is temporarily stored in the code buffer 82. For such a period of time, the counter 86 counts the code data amount which is generated from the coding circuit 80 in parallel. When the coding processing for one frame is finished, the insertion circuit 84 inserts the code indicative of the code data amount from the counter 86 to the position before the code data from the code buffer 82. That is, the insertion circuit 84 generates the code data after the code indicative of the generated code amount data.

On the video receiving side, as will be understood from the flowcharts shown in FIGS. 13 and 14, the frame skipping processing upon synchronization reproduction can be easily executed by the code indicative of the code data amount.

According to the existing coding method, the code indicative of the code data amount cannot be arbitrarily inserted. However, for example, in the standard coding method such as MPEG or the like, generally, a "user area" which can be freely used by the user to a certain extent exists. By writing the information of the code data amount of one frame into the "user area", similar function and effect can be obtained. That is, in place of inserting the code indicative of the code data amount by the inserting circuit 84, it is sufficient to write the code indicative of the code data amount of one frame into the "user area". Since the other processes are substantially the same as those in the foregoing embodiments, their descriptions are omitted here.

In the embodiment, although the data indicative of the code amount has been inserted in every frame, namely, every picture plane, the invention is not limited to such an example but the code amount data can also be inserted on a unit basis of every two picture planes, every five picture planes, or the like.

It will be obviously understood that a part of or all of the above processes of the embodiment can be realized by either hardware or software.

As described above, when embodying the invention, in addition to the case of constructing the decoding circuit 68 shown in FIG. 9 by hardware, a large effect is derived in the case where the decoding is performed by the CPU in accordance with software including a decoding program.

FIG. 16 is a block diagram showing a construction in which the decoding is executed by the CPU in place of the decoding circuit shown in FIG. 9.

In FIG. 16, reference numeral 100 denotes a RAM to store the code data. The coded image data which was read out from the file by a CPU 102 is stored in the RAM 100.

Reference numeral 101 denotes a ROM in which software including a decoding algorithm to decode the code data by the CPU 102 is stored.

Reference numeral 102 denotes a CPU to execute the decoding algorithm; 103 a timer to generate a time serving as a reference for the judgment in the flowcharts of FIGS. 13 and 14 mentioned above; and 104 a frame memory to store image data decoded by the CPU 102.

Reference numeral 106 denotes a direct memory access circuit (DMA) to output the image data stored in the frame memory 104 to the LUT 56 in FIG. 4.

The decoding circuit shown in FIG. 9 is constructed as shown in FIG. 16 as mentioned above, so that the effect to embody the invention becomes more remarkable.

What is claimed is:

1. An image processing apparatus comprising:
   a) input means for inputting coded image data for a plurality of picture planes at a predetermined rate through a network, the coded image data being coded by using intrapicture coding and interpicture coding; and
   b) decoding means for decoding the coded image data, wherein said decoding means skips a decoding of the coded image data in units of picture planes when the decoding is not performed at a predetermined timing suitable to the predetermined rate, and performs a decoding of the coded image data coded by the intrapicture coding after a skipped image plane,
   wherein said decoding means determines whether or not the decoding is performed at a predetermined timing suitable to the predetermined rate for each picture frame.

2. An apparatus according to claim 1, wherein said input means inputs the coded image data through a network.

3. An apparatus according to claim 1, wherein the intrapicture coding is performed every predetermined number of picture planes.

4. An apparatus according to claim 1, wherein said decoding means decodes the coded image data by a software.

5. An apparatus according to claim 1, further comprising output means for outputting the decoded image data to a monitor.

6. An apparatus according to claim 1, further comprising means for halftone processing the coded image data decoded by said decoding means.

7. An image processing apparatus comprising:
   a) input means for inputting compression-coded image data for a plurality of picture planes at a predetermined rate through a network; and
   b) decoding means for decoding the compression-coded image data,
   wherein said decoding means skips a decoding of the compression-coded image data in units of picture planes when the decoding is not performed at a predetermined timing suitable to the predetermined rate, and decodes the compression-coded image data after a predetermined number of picture planes, and
   wherein said decoding means determines whether or not the decoding is performed at a predetermined timing suitable to the predetermined rate for each picture frame.

\* \* \* \* \*

UNITED STATES PATENT AND TRADEMARK OFFICE
CERTIFICATE OF CORRECTION

PATENT NO. : 5,898,461

DATED : April 27, 1999

INVENTOR(S) : HIDEFUMI OHSAWA ET AL.

It is certified that error appears in the above-identified patent and that said Letters Patent is hereby corrected as shown below:

ON TITLE PAGE
  [56] References Cited "1041380" should read
      --1-041380-- and
    Attorney, Agent, or Firm- "Fitzpatric, Cella Harper & Scinto" should read --Fitzpatrick, Cella, Harper & Scinto--.

IN THE DRAWINGS

Sheet 4 of 9 "APPRICATION" should read --APPLICATION--.

COLUMN 2
  line 17, "multi task" should read --multi-task--; and
  line 63, "intra picture" should read --intrapicture--.

COLUMN 3
  line 51, "a a" should read --a--.

COLUMN 4
  line 52, "a" should read --the--, and "the" should read --a--.

UNITED STATES PATENT AND TRADEMARK OFFICE
CERTIFICATE OF CORRECTION

PATENT NO.   : 5,898,461

DATED        : April 27, 1999

INVENTOR(S)  : HIDEFUMI OHSAWA ET AL.

It is certified that error appears in the above-identified patent and that said Letters Patent is hereby corrected as shown below:

COLUMN 5
  line 31, "the" (2nd occurrence) should be deleted.

COLUMN 6
  line 54, "reproduced," should read --reproduced--.

COLUMN 7
  line 59, "loop,sy" should read --loop, a--.

Signed and Sealed this

Eleventh Day of January, 2000

Attest:

Q. TODD DICKINSON

*Attesting Officer*     *Acting Commissioner of Patents and Trademarks*